United States Patent [19]

Furuya et al.

[11] Patent Number: 4,991,678

[45] Date of Patent: * Feb. 12, 1991

[54] SYSTEM METHOD FOR DRIVE FORCE DISTRIBUTING CONTROL FOR FRONT-AND-REAR-WHEEL DRIVE MOTOR VEHICLE

[75] Inventors: Kunitaka Furuya; Yasuji Shibahata, both of Tochigi, Japan

[73] Assignee: Honda Giken Kogyo Kabushiki Kaisha, Tokyo, Japan

[ * ] Notice: The portion of the term of this patent subsequent to Dec. 26, 2006 has been disclaimed.

[21] Appl. No.: 272,962

[22] Filed: Nov. 18, 1988

[30] Foreign Application Priority Data

Nov. 20, 1987 [JP] Japan ................................. 62-294803

[51] Int. Cl.⁵ ............................................. B60K 23/04
[52] U.S. Cl. ................................... 180/197; 180/248; 364/424.1
[58] Field of Search ............... 180/248, 247, 197, 233; 364/424.1

[56] References Cited

U.S. PATENT DOCUMENTS

| | | | |
|---|---|---|---|
| 4,552,241 | 11/1985 | Suzuki | 180/197 |
| 4,723,624 | 2/1988 | Kawasaki et al. | 180/248 |
| 4,757,870 | 7/1988 | Torii et al. | 180/197 |
| 4,781,265 | 11/1988 | Weiler et al. | 180/197 |
| 4,805,721 | 2/1989 | Takahashi et al. | 180/248 |

FOREIGN PATENT DOCUMENTS

| | | |
|---|---|---|
| 0076148A1 | 6/1983 | European Pat. Off. . |
| 0231665A1 | 12/1987 | European Pat. Off. . |
| 3626025A1 | 3/1987 | Fed. Rep. of Germany . |
| 57-134330 | 8/1982 | Japan . |
| 0006831 | 1/1987 | Japan ................................. 180/197 |
| 62-7007 | 2/1987 | Japan . |
| 62-9458 | 2/1987 | Japan . |

Primary Examiner—David M. Mitchell
Attorney, Agent, or Firm—Armstrong, Nikaido, Marmelstein, Kubovcik & Murray

[57] ABSTRACT

A system for controlling distribution of drive forces from a drive source unit to front and rear wheels of a four-wheel drive motor vehicle includes drive force distributing means for transmitting the drive forces to the front and rear wheels at a continuously variable distribution ratio, first speed detecting means for detecting a rotational speed (Nf) of the front wheels, second speed detecting means for detecting a rotational speed (Nr) of the rear wheels, and control means for calculating a slip ratio (S) of the rear wheels to a road on which the motor vehicle is running based on the rotational speeds (Nf, Nr) of the front and rear wheels, calculating a distribution ratio between the drive forces to be distributed to the front and rear wheels based on the slip ratio (S), and controlling the drive force distributing means to transmit the drive forces from the drive source unit to the front and rear wheels according to the distribution ratio. According to a method of controlling distribution of drive forces to the front and rear wheels, a continuously variable optimum distribution ratio is determined in view of a slip ratio between the wheels and the road, and the drive forces from the drive source unit are distributed and transmitted to the front and rear wheels according to the distribution ratio.

10 Claims, 2 Drawing Sheets

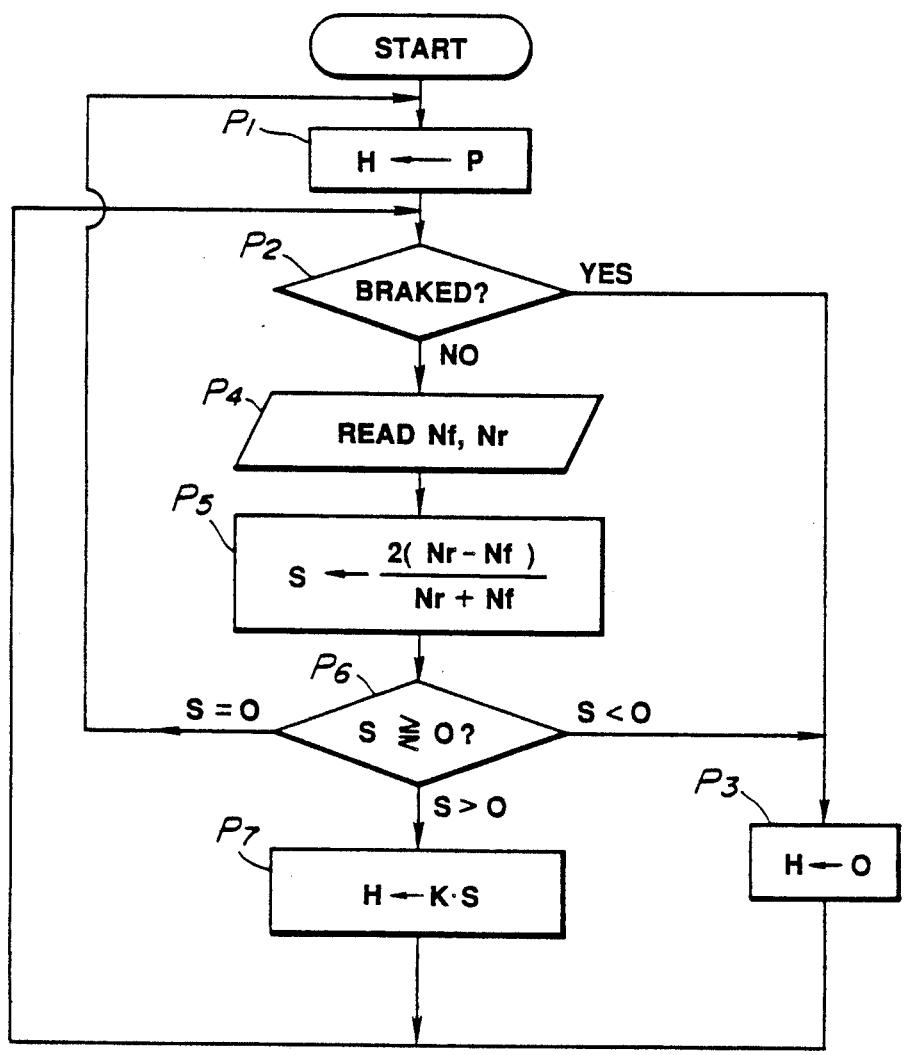

SYSTEM METHOD FOR DRIVE FORCE DISTRIBUTING CONTROL FOR FRONT-AND-REAR-WHEEL DRIVE MOTOR VEHICLE

BACKGROUND OF THE INVENTION

1. Field of the Invention

The present invention relates to a system for and a method of controlling drive force distribution for a motor vehicle with drivable front and rear wheels, and more particularly to a system for and a method of controlling the distribution of drive forces from an engine to front and rear wheels according to a continuously variable optimum distribution ratio based on a slip ratio between the wheels and the road surface on which the motor vehicle is running.

2. Description of the Relevant Art

There are known part-time four-wheel drive motor vehicles which are usually propelled in a two-wheel drive mode by driving front or rear wheels only and which can be propelled as desired in a four-wheel drive mode with the front and rear wheels both being positively driven.

Japanese Laid-Open Patent Publication No. 62-7007 (published: Feb. 14, 1987) discloses a drive mode selector device for switching between two-wheel and four-wheel drive modes for a part-time four-wheel drive motor vehicle that is based on and converted from a two-wheel drive motor vehicle known as a front-engine front-wheel drive motor vehicle. The disclosed drive mode selector device controls an electromagnetic clutch to connect the front and rear wheels for switching from the two-wheel drive mode to the four-wheel drive mode when certain conditions such as slippage of the wheels to the road are met. The earlier drive mode selector device however does not determine an optimum distribution ratio continuously variably according to the degree of slippage between the wheels and the road or the condition of the road surface on which the motor vehicle is running, and hence does not distribute the drive forces from the engine to the front and rear wheels according to such a distribution ratio.

SUMMARY OF THE INVENTION

In view of the aforesaid drawbacks of the conventional drive mode selector device for four-wheel drive motor vehicles, it is an object of the present invention to provide a system for and a method of controlling the distribution of drive forces to front and rear wheels of a four-wheel drive motor vehicle based on an optimum distribution ratio which is continuously variable according to a slip ratio or a road surface condition, particularly for increasing maneuvering stability when the motor vehicle is running on a road which has a low coefficient of friction with respect to the running road wheels.

According to the present invention, there is provided a system for controlling distribution of drive forces from a drive source unit to front and rear wheels of a four-wheel drive motor vehicle, the system comprising drive force distributing means for transmitting the drive forces to the front and rear wheels at a continuously variable distribution ratio, first speed detecting means for detecting a rotational speed (Nf) of the front wheels, second speed detecting means for detecting a rotational speed (Nr) of the rear wheels, and control means for calculating a slip ratio (S) of the rear wheels to a road on which the motor vehicle is running based on the rotational speeds (Nf, Nr) of the front and rear wheels, calculating a distribution ratio between the drive forces to be distributed to the front and rear wheels based on the slip ratio (S), and controlling the drive force distributing means to transmit the drive forces from the drive source unit to the front and rear wheels according to the distribution ratio.

According to the present invention, there is also provided a method of controlling distribution of drive forces from a drive source to front and rear wheels of a four-wheel drive motor vehicle having a transfer clutch which can interconnect the drive source and the front wheels with a continuously variable degree of engagement ranging from 0% to 100%, the method comprising the steps of (a) engaging the transfer clutch with 100% degree of engagement, (b) detecting whether the motor vehicle is braked, (c) when the motor vehicle is not braked, detecting speeds of rotation of the front and rear wheels to calculate a slip ratio of the rear wheels to a road on which the motor vehicle is running based on the detected speeds of rotation, and (d) determining an optimum distribution ratio between drive forces to be distributed to the front and rear wheels based on the calculated slip ratio, and adjusting the desired degree of engagement of the transfer clutch according to the distribution ratio.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a flowchart of an operation sequence of the drive force distribution control system.

DETAILED DESCRIPTION OF THE PREFERRED EMBODIMENT

Figure 1:
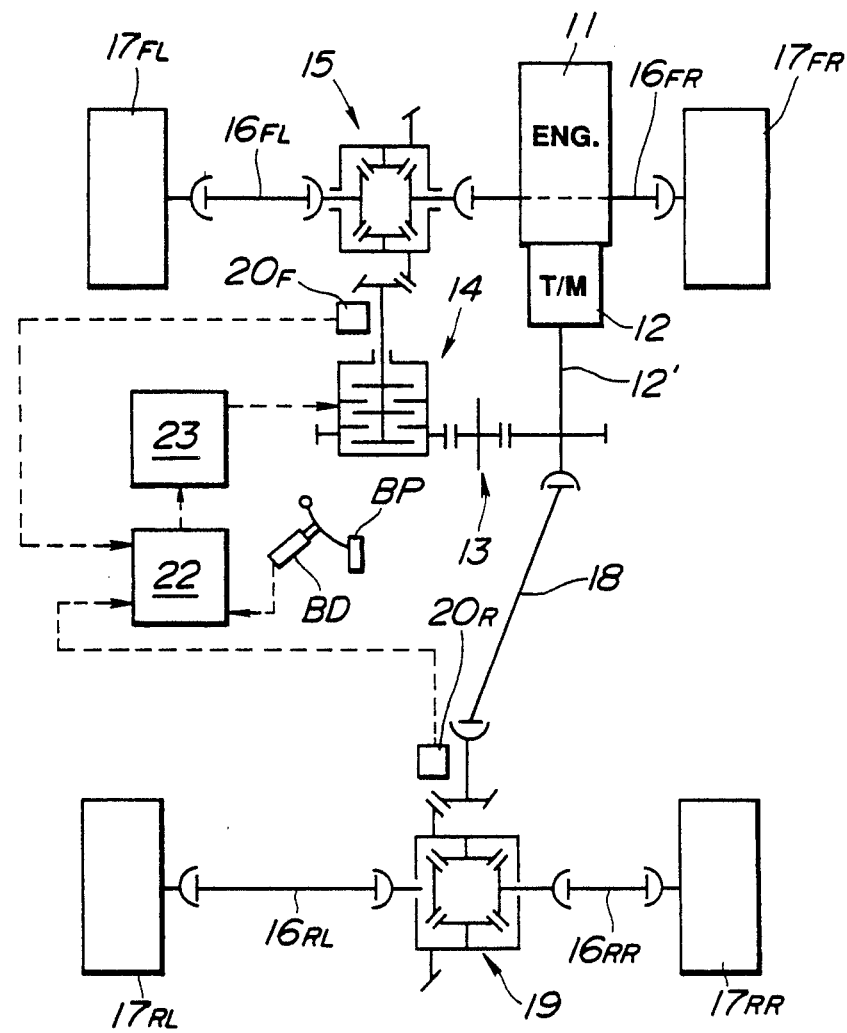
FIG. 1 is a schematic plan view of a four-wheel drive motor vehicle incorporating a drive force distribution control system according to an embodiment of the present invention.

FIG. 1 schematically shows a four-wheel drive motor vehicle incorporating therein a drive force distribution control system in accordance with an embodiment of the present invention.

As shown in FIG. 1, the four-wheel drive motor vehicle has an engine 11 and a transmission 12 unitarily coupled thereto, the engine 11 and the transmission 12 jointly constituting a drive source unit. The transmission 12 has an output shaft 12' from which drive forces are transmitted to a pair of front wheels 17FL, 17FR through a front wheel drive force transmitting system comprising a parallel-gear mechanism 13, a hydraulic multiple-plate clutch 14, a front wheel differential 15, and axles 16FL, 16FR, and also to a pair of rear wheels 17RL, 17RR through a rear wheel drive force transmitting system comprising a propeller shaft 18, a rear wheel differential 19, and axles 16RL, 16RR. The front wheels will hereinafter be referred to collectively as front wheels 17F, and the rear wheels will hereinafter be referred to collectively as rear wheels 17R.

A front wheel rotational speed sensor 20F is disposed near the input shaft of the front wheel differential 15, and a rear wheel rotational speed sensor 20R is disposed near the input shaft of the rear wheel differential 19. The rotational speed sensors 20F, 20R are electrically connected to a control unit 22. The front and rear wheel rotational speed sensors 20F, 20R comprise known reed switches or the like for producing pulsed signals having frequencies proportional to the speeds of rotation of the front and rear wheels 17F, 17R, respectively.

The control unit or control means 22 comprises a microcomputer for processing output signals from the respective sensors 20F, 20R to control a pressure control valve 28 (described later on).

The hydraulic multiple-plate clutch 14 has an oil chamber connected to a hydraulic pressure control circuit 23. The hydraulic multiple-plate clutch 14 can vary the torque transmitted from the drive source unit to the front wheel differential 15 or the front wheels 17F dependent on the oil pressure supplied from the hydraulic pressure control circuit 23 to the oil chamber of the clutch 14.

Figure 2:
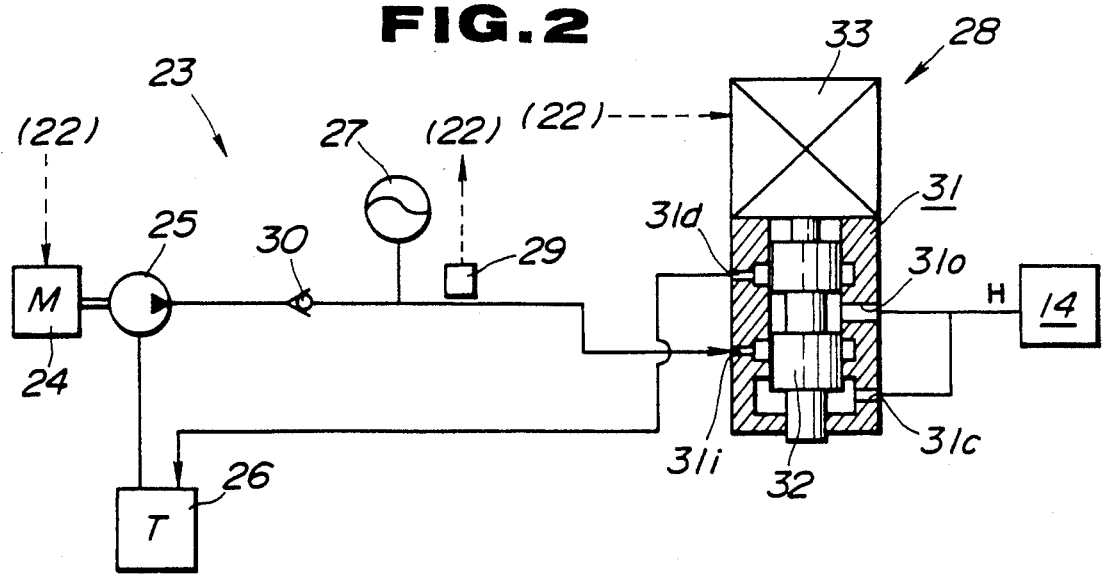
FIG. 2 is a circuit diagram of a hydraulic control circuit employed in the drive force distribution control system.

As schematically illustrated in FIG. 2, the hydraulic pressure control circuit 23 includes a pump 25 driven by a motor 24 for discharging oil under pressure from a reservoir tank 26, an accumulator 27 for storing the oil pressure discharged by the pump 25, and a solenoid-operated pressure control valve 28 with a central closed position for supplying the oil pressure to the hydraulic multiple-plate church 14. The motor 24 is electrically connected to the control unit 22. The accumulator 27 is associated with a pressure sensor 29 electrically connected to the control unit 22. The motor 24 is energized when the oil pressure as detected by the pressure sensor 29 drops below a predetermined pressure level. A one-way valve 30 is connected between the pump 25 and the accumulator 27 for allowing an oil flow only from the pump 25 to the accumulator 27. The pressure control valve 28 includes a valve body or casing 31 having an inlet port 31i connected to the accumulator 27, a drain port 31d connected to the reservoir tank 26, an outlet port 31o and a control port 31c which are coupled to the oil chamber of the hydraulic multiple-plate clutch 14. The pressure control valve 28 also has a spool 32 axially slidably disposed in the value casing 31 and connected to a solenoid 33 electrically joined to the control unit 22. The oil pressure supplied from the outlet port 31o to the hydraulic multiple-plate clutch 14 is controlled linearly according to an electric current flowing through the solenoid 33. The pressure control valve 28, while allowing the oil pressure drawn from the oil chamber of the clutch 14 via the control port 31c and the biasing force of the solenoid 33 to act on the spool 32 in opposite axial directions, maintains the oil pressure supplied to the oil chamber of the clutch 14 at a pressure level corresponding to the value of an electric current flowing through the solenoid 33.

The hydraulic pressure control circuit 23 and the hydraulic multiple-plate clutch 14 jointly constitute a drive force distributing means which is controlled to distribute and transmit drive forces from the drive source unit proportionally to the front and rear wheels 17F, 17R based on a distribution ratio determined by the control unit or control means 22.

Operation of the drive force distribution control system of the invention will be described with reference to the flowchart of FIG. 3. A front wheel drive force TF and a rear wheel drive force TR are herein defined as being positive in the direction in which they are applied to the front and rear wheels, and a drive force distribution ratio R is herein defined as a value R=TF/TR which is obtained by dividing the front wheel drive force TF by the rear wheel drive force TR.

By repeatedly executing the operation sequence of FIG. 3 with the microcomputer of the control unit 22, the drive force distribution control system controls oil pressure H supplied to the hydraulic multiple-plate clutch 14 for optimally distributing the drive forces from the drive source unit to the front and rear wheels 17F, 17R.

When an ignition key is turned on, the oil pressure H is set to a relatively high initial level P in a step P1.

The oil pressure level P is selected to be large enough to keep the hydraulic multiple-plate clutch 14 engaged. The drive forces from the output shaft 12' of the drive source unit are divided and transmitted to the front wheel drive force distributing system by the parallel-gear mechanism 13, as described above. With the hydraulic multiple-plate clutch 14 engaged ideally, it is possible to distribute final drive forces between the front and rear wheels 17F, 17R at any desired ratio by adjusting or modifying the parallel-gear mechanism 13 and the front and rear wheel drive force transmitting systems. In the illustrated embodiment, when the hydraulic multiple-plate clutch 14 is engaged under ideal conditions, the ratio between final drive forces to be distributed to the front and rear wheels 17F, 17R is selected in advance to be substantially fifty-fifty, or equally distributed. By applying the oil pressure P to the clutch 14 to engage the same under such conditions (i.e., the degree of engagement of the clutch 14 is 100%) in the step P1, the drive forces are transmitted to the front and rear wheels 17F, 17R at the substantially fifty-fifty distribution ratio to start the motor vehicle quickly in a four-wheel drive mode.

A next step P2 determines whether the motor vehicle is braked by depressing a brake pedal BP (FIG. 1) based on a signal from a braking detector BD associated with the brake pedal BP. If the motor vehicle is braked, then the oil pressure H is reduced to zero (i.e., the degree of engagement of the clutch 14 is 0%) in a step P3 to drive the motor vehicle in a rear-wheel drive mode for stabilizing the braked condition. The braked condition of the motor vehicle may be detected by some other means instead of the braking detector BD. When the motor vehicle is braked, the oil pressure H may not necessarily be eliminated insofar as at least the relative torque transmission between the front and rear wheels 17F, 17R can be reduced.

If the motor vehicle is not braked, control proceeds from the step P2 to a step P4.

In the step P4, a front wheel rotational speed Nf and a rear wheel rotational speed Nr are read from output signals produced by the rotational speed sensors 20F, 20R. Then, the difference between the speeds of rotation of the rear and front wheels 17R, 17F is divided by the speed of the motor vehicle, i.e., the difference between the front and rear wheel rotational speeds is divided by the mean value of the front and rear wheel rotational speeds to find a slip ratio S according to the following equation (1) in a step P5:

$$S = 2(Nr - Nf)/(Nr + Nf) \qquad (1)$$

Then, the value of the slip ratio S is checked in a step P6. If the slip ratio S is zero, then control returns back to the step P1. If the slip ratio S is negative, then control jumps to the step P3. Where the motor vehicle is at rest and hence the slip ratio S is zero or substantially zero, since the oil pressure H is set to the relatively large level P, as described above, the motor vehicle can be started quickly without slippage in the four-wheel drive mode. Where the motor vehicle is making a turn and the slip ratio S is negative, i.e., if either the front wheel drive force TF or the rear wheel drive force TR is negative, then the oil pressure H is reduced to zero, and the phenomenon of tight-turn braking is prevented.

If the slip ratio S is positive in the step P6, then control goes to a step P7. The positive slip ratio S means that the rear wheels 17R are skidding on or idly rotating with respect to the road at the slip ratio S.

In the step P7, the oil pressure H is set to a value KS which is proportional to the slip ratio S, K being a proportionally constant which is determined to be of an optimum value empirically by a simulation experiment or the like.

As described above, if the slip ratio S is positive, then the oil pressure H is set to a value proportional to the slip ratio S. Therefore, the drive force distribution ratio R at which the drive forces are distributed between the front and rear wheels is controlled in proportion to the slip ratio S. When the motor vehicle is running on a road with a low coefficient of friction, since the distribution ratio R is controlled in proportion to the coefficient of friction, the motor vehicle is prevented from oversteering.

The drive force distribution control system determines the coefficient of friction of the road on which the motor vehicle is running, indirectly from the slip ratio S, and increases the drive force distributed to the front wheels when the slip ratio S is large. Therefore, the drive force distribution control system can prevent the motor vehicle from developing an understeering characteristic when the motor vehicle is running on a road with a low coefficient of friction. Since the slip ratio S can be determined from detected signals from simple sensors such as the rotational speed sensors 20F, 20R, it is not necessary to employ expensive sensors and the cost of manufacture of the drive force distribution control system can be reduced.

In the illustrated embodiment, the oil pressure H, i.e., the drive force distribution ration R is determined as a linear function of the slip ratio S. However, the oil pressure H or the drive force distribution ratio R may be determined as a quadratic function of the slip ratio S or may be determined by table lookup rather than the algorithm. The process of determining the slip ratio S is not limited to the equation (1), but a parameter indicating the extent to which the wheels slip with respect to the road may be employed instead of the slip ratio.

While the hydraulic circuit arrangement is described and illustrated, the clutch 14 may be any of other types which may be controlled by another clutch control system.

With the present invention, as described above, the drive force distribution control system for a four-wheel drive motor vehicle detects a slip ratio of wheels and increases a drive force transmitted to the front wheels based on the slip ratio when the slip ratio is large. Therefore, when the motor vehicle runs on a road having a low coefficient of friction, the motor vehicle is prevented from oversteering and is given good manueverability. The drive force distribution control system can be manufactured at a reduced cost since no expensive sensors are required.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A system for controlling distribution of drive forces from a drive source unit of front and rear wheels of a four-wheel drive motor vehicle, said system comprising:
   drive force distributing means for transmitting drive forces to said front and rear wheels proportionally, at a continuously variable distribution ratio;
   first speed detecting means for detecting a rotational speed (Nf) of said front wheels;
   second speed detecting means for detecting a rotational speed (Nr) of said rear wheels;
   control means including means for calculating a slip ratio (S), wherein $S = 2(Nr - Nf)/(Nr + Nf)$, of said rear wheels to said front wheels for a condition of a road on which the motor vehicle is running and for calculating an optimum distribution ratio between the drive forces to be distributed to said front and rear wheels based on said slip ratio (S), and
   means for controlling said drive force distributing means to transmit the drive forces from the drive force unit proportionally to said front and rear wheels according to said calculated optimum distribution ratio.

2. A system according to claim 1, wherein said drive force distributing means has a drive force distributing system for transmitting the drive forces from the drive source unit directly to said rear wheels.

3. A system according to claim 1, further including braking detecting means for detecting a braked condition of said motor vehicle, and wherein said control means comprises means for controlling said drive force distributing means to reduce the drive force distributed to said front wheels for driving substantially only the rear wheels when the braked condition of the motor vehicle is detected by said braking detecting means.

4. A system according to claim 1, wherein said control means comprises means for determining said distribution ratio so as to transmit a greater drive force from said drive force unit to said front wheels than to said rear wheels in proportion to said slip ratio.

5. A method for controlling distribution of drive forces from a drive source to front and rear wheels of a four-wheel drive motor vehicle having a transfer clutch which can interconnect the drive source and the front wheels with a continuously variable degree of engagement ranging from 0% to 100%, said method comprising the steps of:
   (a) engaging said transfer clutch with 100% degree of engagement;
   (b) in this condition detecting whether the motor vehicle is braked;
   (c) when the motor vehicle is not braked, detecting independently speeds of rotation of said front wheels (Nf) and rear wheels (Nr), and calculating from said speeds of rotation a slip ratio (S), wherein $S = 2(Nr - Nf)/(Nr + Nf)$, of the rear wheels to the front wheels for a condition of a road on which the motor vehicle is running;

(d) determining empirically a proportionality constant K that provides an optimum distribution ratio between forces to the front and rear wheels for various road conditions represented by values of S; and (e) based on said constant K and said calculated slip ratio (S), adjusting the degree of engagement of said transfer clutch to achieve said optimum distribution ratio.

6. A method according to claim 5, further including the step of:

adjusting the degree of engagement of said transfer clutch to substantially 0% in the step (e) when the motor vehicle is braked.

7. A method according to claim 5, further including the step of:

adjusting the degree of engagement of said transfer clutch to substantially 0% in the step (e) when the calculated slip ratios is negative.

8. A method according to claim 5, further including the step of:

adjusting the degree of engagement of said transfer clutch to substantially 100% in the step (e) when the calculated slip ratio is zero.

9. A method according to claim 5, wherein only when the calculated slip ratios is positive the degree engagement of said transfer clutch is adjusted to said optimum distribution ratio.

10. A method according to claim 9, wherein said optimum distribution ratio is determined so as to distribute a greater drive force to said front wheels than said rear wheels in proportion to said calculated slip ratios.

* * * * *

UNITED STATES PATENT AND TRADEMARK OFFICE
CERTIFICATE OF CORRECTION

PATENT NO. : 4,991,678

DATED : February 12, 1991

INVENTOR(S) : FURUYA et al

It is certified that error appears in the above-identified patent and that said Letters Patent is hereby corrected as shown below:

On the cover page, Item [54], "SYSTEM METHOD FOR DRIVE FORCE DISTRIBUTING CONTROL FOR FRONT-AND-REAR-WHEEL DRIVE MOTOR VEHICLE" should read --SYSTEM AND METHOD FOR DRIVE FORCE DISTRIBUTION CONTROL FOR FRONT-AND-REAR-WHEEL DRIVE MOTOR VEHICLE--.

Signed and Sealed this

Twenty-first Day of July, 1992

Attest:

DOUGLAS B. COMER

Attesting Officer

Acting Commissioner of Patents and Trademarks